US011486538B2

(12) United States Patent
Hendricks (10) Patent No.: US 11,486,538 B2
(45) Date of Patent: Nov. 1, 2022

(54) DEVICES FOR HANGING ITEMS FROM HORIZONTALLY-ORIENTED STRUCTURES, AND ASSOCIATED METHODS

(71) Applicant: Shining Sea Trading Company, West Valley City, UT (US)

(72) Inventor: Jared Hendricks, Draper, UT (US)

(73) Assignee: Shining Sea Trading Company, West Valley City, UT (US)

( * ) Notice: Subject to any disclaimer, the term of this patent is extended or adjusted under 35 U.S.C. 154(b) by 0 days.

(21) Appl. No.: 17/155,008

(22) Filed: Jan. 21, 2021

(65) Prior Publication Data

US 2021/0239263 A1 Aug. 5, 2021

Related U.S. Application Data

(63) Continuation of application No. 15/929,228, filed on Feb. 20, 2020, now abandoned, which is a
(Continued)

(51) Int. Cl.
*F16M 13/02* (2006.01)
*F16B 2/12* (2006.01)
*A47G 33/00* (2006.01)
*F16B 45/00* (2006.01)
*F16B 2/06* (2006.01)
*F16B 2/10* (2006.01)
*A47G 29/093* (2006.01)
(Continued)

(52) U.S. Cl.
CPC ......... *F16M 13/022* (2013.01); *A47G 29/093* (2013.01); *A47G 33/00* (2013.01); *F16B 2/005* (2013.01); *F16B 2/065* (2013.01); *F16B 2/10* (2013.01); *F16B 2/12* (2013.01); *F16B 45/00* (2013.01); *A47G 29/083* (2013.01)

(58) Field of Classification Search
CPC ......... F16M 13/022; F16B 2/005; F16B 2/12; F16B 45/00; A47G 33/00; A47G 29/00; A47G 29/083
See application file for complete search history.

(56) References Cited

U.S. PATENT DOCUMENTS

2,470,991 A * 5/1949 Kindorf ............... F16L 3/24
248/72
2,896,896 A 1/1955 Revzin
(Continued)

*Primary Examiner* — Tan Le
(74) *Attorney, Agent, or Firm* — Todd Alder (57) ABSTRACT

A hanger device structurally configured to couple at an edge of a horizontal support is disclosed and described, the hanger device including a hanger support including a horizontal top support having a planar undersurface structurally configured to rest on an upper surface of the horizontal support when in use and an edge extension extending downwardly from the top support and configured to abut an edge of the horizontal support. The hanger device can further include a lower hanger coupled to and extending downwardly from the edge extension, a lower hook coupled to the lower hanger and oriented to suspend a decorative item therefrom, and an engagement lock slidably coupled to the lower hanger and configured to contact a bottom surface of the horizontal support opposite the horizontal top support to secure the hanger device to the horizontal support.

7 Claims, 7 Drawing Sheets

Related U.S. Application Data continuation of application No. 15/929,007, filed on Apr. 10, 2018, now abandoned.

(60) Provisional application No. 62/483,875, filed on Apr. 10, 2017.

(51) Int. Cl.
 *F16B 2/00* (2006.01)
 *A47G 29/08* (2006.01)

(56) References Cited

U.S. PATENT DOCUMENTS

| | | | |
|---|---|---|---|
| 3,310,911 A | 3/1967 | Boser et al. | |
| 3,321,161 A * | 5/1967 | Hirt | F16L 3/24 248/72 |
| 3,572,623 A * | 3/1971 | Lapp | F16L 3/24 248/72 |
| 4,019,705 A | 4/1977 | Habuda, Sr. et al. | |
| 5,094,417 A * | 3/1992 | Creed | A47G 29/083 248/339 |
| 5,584,462 A | 12/1996 | Reese | |
| 5,779,198 A | 7/1998 | Rutherford et al. | |
| 5,842,671 A | 12/1998 | Gibbs | |
| 5,934,016 A | 8/1999 | Jones | |
| 6,439,522 B1 * | 8/2002 | Yeh | A47B 96/061 248/228.6 |
| 6,565,048 B1 | 5/2003 | Meyer | |
| 7,252,274 B1 | 8/2007 | Brannen | |
| D568,727 S | 5/2008 | Walker et al. | |
| 8,678,332 B2 | 3/2014 | Benthien et al. | |
| 2005/0056746 A1 * | 3/2005 | Landver | A47G 29/083 248/914 |
| 2015/0097097 A1 | 4/2015 | Early | |
| 2015/0238027 A1 | 8/2015 | Yeh | |

* cited by examiner

DEVICES FOR HANGING ITEMS FROM HORIZONTALLY-ORIENTED STRUCTURES, AND ASSOCIATED METHODS

CROSS-REFERENCE TO RELATED APPLICATIONS

This application is a continuation of U.S. patent application Ser. No. 15/929,228, filed on Feb. 20, 2020, which is a continuation of U.S. patent application Ser. No. 15/929,007, filed on Apr. 10, 2018, which claims the benefit of U.S. Provisional Patent Application No. 62/483,875, filed on Apr. 10, 2017, each of which is incorporated herein by reference in its entirety.

BACKGROUND

Fireplace mantles and other similar horizontally-oriented structures, shelving, and the like, are often used to hang decorative and non-decorative items from an exposed edge. In many Christmas traditions, for example, Christmas stockings are hung along a mantle, such that they hang downwardly from the mantle edge. Such stockings can similarly be hung along edges of other similarly-oriented structures, such as shelves, for example.

DESCRIPTION OF EMBODIMENTS

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of physical connection or attachment between one item and another item, and includes relationships of either direct or indirect connection or attachment. Any number of items can be coupled, such as materials, components, structures, layers, devices, objects, etc.

As used herein, "directly coupled" refers to a relationship of physical connection or attachment between one item and another item where the items have at least one point of direct physical contact or otherwise touch one another. For example, when one layer of material is deposited on or against another layer of material, the layers can be said to be directly coupled.

As used herein, "adjacent" refers to the proximity of two structures or elements. In one example, elements that are identified as being "adjacent" may be either abutting or connected. In another example, such elements may also be near or close to each other without necessarily contacting each other. The exact degree of proximity may in some cases depend on the specific context.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, numerical values as applied to the content of a material in a composition of materials, including numerical values relative to one another, such as ratios, can be considered to be measured in atomic % (i.e. at %).

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

DESCRIPTION OF EXAMPLE EMBODIMENTS

Fireplace mantles and other similar horizontally-oriented structures, shelving, and the like, are often used to hang decorative and non-decorative items from an exposed edge. In many Christmas traditions, for example, Christmas stockings are hung along a mantle, such that they hang downwardly from the mantle edge. Such stockings can similarly be hung along edges of other similarly-oriented structures, such as shelves, for example. In addition to Christmas stockings, various decorative items, garlands, lighting, and the like, can be similarly displayed. One problem that can arise, particularly for more weighty items such as Christmas stockings, relates to the secure attachment of these items to the edge of the horizontally-oriented structure. Various traditional techniques have included nails, screws, clamps, and the like, which while facilitating a secure attachment to the structure edge, generally cause undesirable damage to such structures.

Figure 1A:
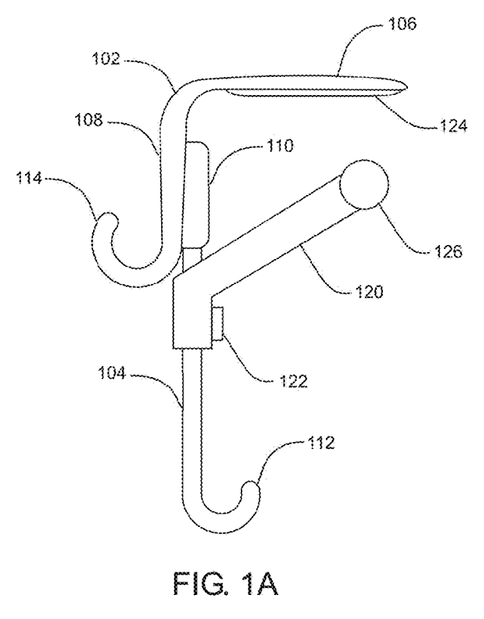
FIG. 1A illustrates a side view of a hanger device in accordance with an example embodiment.
Figure 1B:
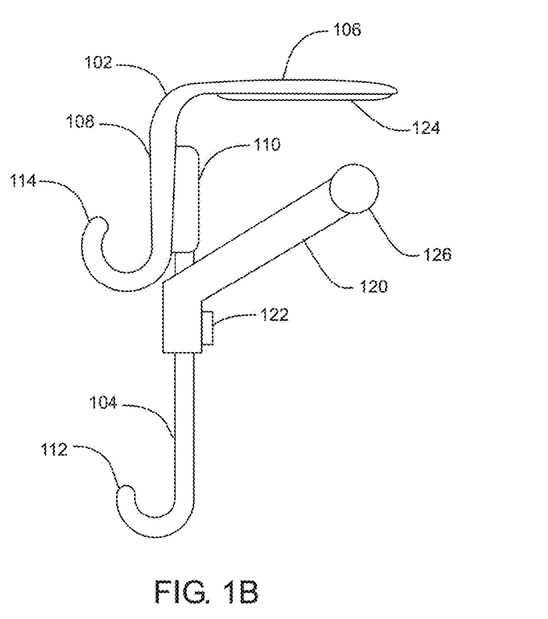
FIG. 1B illustrates a side view of a hanger device in accordance with an example embodiment.
Figure 1C:
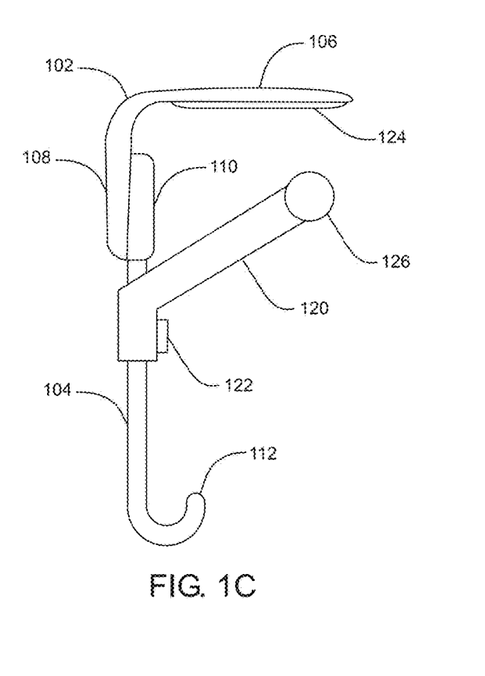
FIG. 1C illustrates a side view of a hanger device in accordance with an example embodiment.

The present disclosure provides solutions for hanging various items from the edges of horizontal structures (i.e., horizontal supports) in a manner that does not result in damage or marring. As is shown in FIGS. 1A-D, for example, a hanger device is provided comprising a hanger support 102, a lower hanger 104, and an engagement lock 120. The hanger support 102 includes a horizontal top support 106 that rests upon an upper surface of a horizontal structure when in use. In the examples shown in FIGS. 1A-C, the hanger support 102 extends downwardly from the top support 106 to couple with the lower hanger 104. This edge extension 108 can be oriented perpendicular to the top support 106, or at any angle or orientation that allows the hanger device to couple at an edge of a horizontal structure. In some examples, the positioning and orientation of the edge extension 108 relative to the top support 106 can be configured according to a shape, orientation, and/or surface configuration of a horizontal structure and/or the associated edge. The edge extension 108 of the hanger support 102 couples to the lower hanger 104, which is positioned to allow an item to be hung therefrom in a position below the edge of the horizontal structure when in use. The lower hanger 104 can be adapted to hang the item directly below the edge, inwardly offset from the edge, outwardly offset from the edge, or the like. The lower hanger 104 can be adapted to hang the item therefrom according to any number of structures and/or techniques, which are not considered to be limiting. For example, the lower hanger 104 in FIGS. 1A-D can include a lower hook 112, from which an item can be hung. The lower hook 112 can be inward-facing, as is shown in FIGS. 1A, C, & D, outward-facing, as shown in FIG. 1B, side-facing (not shown), or facing in any direction therebetween. The lower hanger 104 can include a single lower hook 112, or multiple hooks (not shown), located together at different orientations relative to one another, located at different elevations along the lower hanger 104, or a combination thereof. A lower hook 112 can be located at the termination (i.e., the bottom-most location) of the lower hanger 104, or a portion of the lower hanger 104 can extend downwardly below the lower hook 112. The lower hook 112 can be a modified extension of the lower hanger 104, or a separate structure that is coupled to the lower hanger 104. In addition to hooks, other structures are contemplated that allow an item to be hung from the lower hanger 104, such as loops, spirals, and the like. In some examples, the lower hanger 104 can include a laterally- or bilaterally-extending lower hook support with one or more lower hooks 112 coupled thereto, and offset laterally from the lower hanger 104. In some cases, an upper hook 114 can be coupled to the hanger support 102, such as, for example, at the edge extension 108, as is shown in FIGS. 1A & B.

Figure 1D:
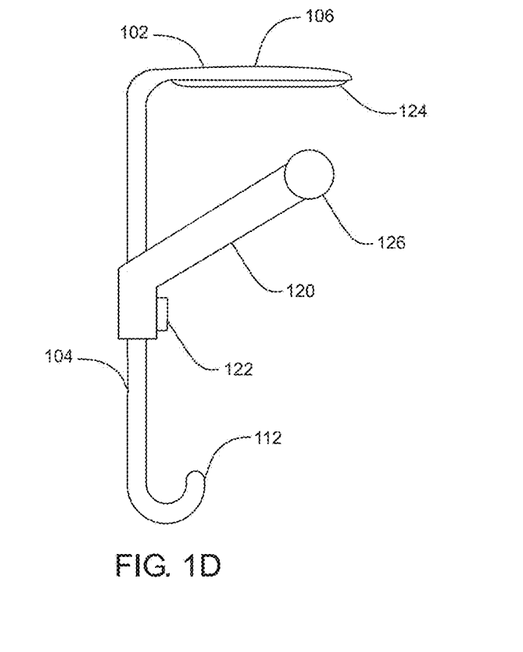
FIG. 1D illustrates a side view of a hanger device in accordance with an example embodiment.

The hanger support 102 can couple to the lower hanger 104 by any known coupling technique and/or structure, which can include removably coupled and non-removably coupled configurations. In the examples shown in FIGS. 1A-C, the hanger support 102 includes a socket 110 or other receiving structure that is adapted to receive and securely couple to the lower hanger 104. The socket 110 can be a removable or a permanent connection to the lower hanger 104. It is additionally contemplated that, in some examples, the lower hanger 104 can include a socket adapted to receive and securely couple to the hanger support 102. Any structure or coupling technique capable of coupling the hanger support 102 to the lower hanger 104 is considered to be within the present scope. As another example, FIG. 1D shows a hanger device whereby the lower hanger 104 is coupled to the top support 106 of the hanger support 102. In one example, the lower hanger 104 can be formed separately from, and subsequently coupled to, the top support 106. In another example, the lower hanger 104 can be a continuous downward extension of the hanger support 102.

Figure 2:
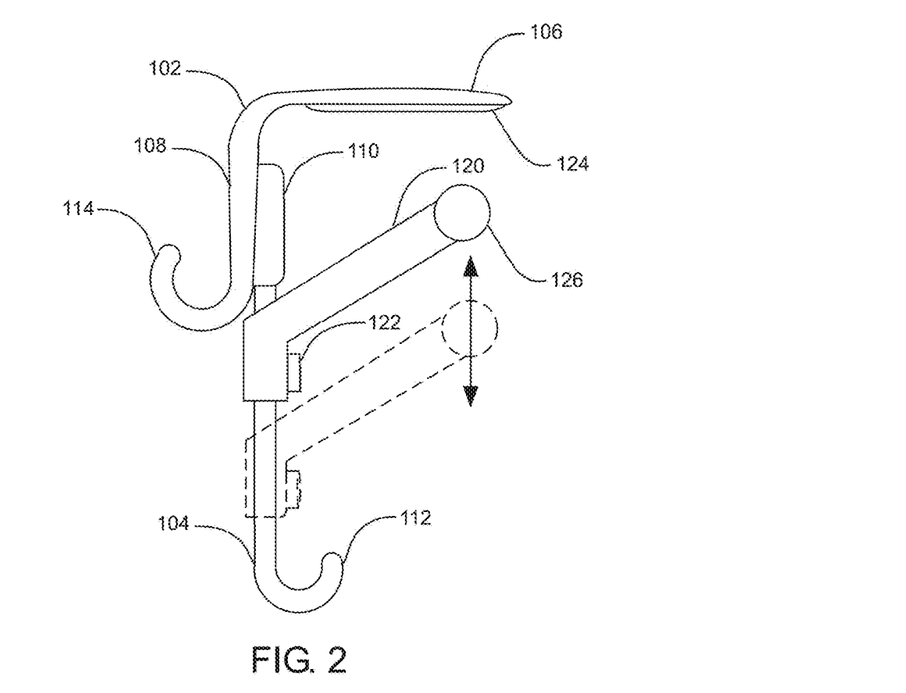
FIG. 2 illustrates a side view of a hanger device in accordance with an example embodiment.

As is shown in FIG. 2, with reference to FIGS. 1A-D, the engagement lock 120 is moveably, or otherwise slidably, coupled to the hanger device, in some cases to the lower hanger 104. The engagement lock 120 can slide up and down along the lower hanger 104, and is thus can be adjustably adapted to accommodate different thicknesses of horizontal structures, such as mantles or shelves. The engagement lock 120 includes a slide lock 122, which is adapted to maintain the engagement lock 120 in a fixed position relative to the top support 106. The slide lock 122 can include any mechanism capable of locking the engagement lock 120 in a fixed position, such as, for example, thumb screws, set screws, springs, locking pins, and the like, including combinations thereof. The engagement lock 120 can be configured in a variety of ways, which can include various structural configurations to increase the gripping force applied to the horizontal structure by the hanger device. For example, the engagement lock 120 can extend from the lower hanger 104 at an oblique angle to contact a bottom surface of the horizontal structure. Such a configuration can reduce moment forces around the horizontal structure that would otherwise tend to cause the hanger device to rotate.

Figure 3:
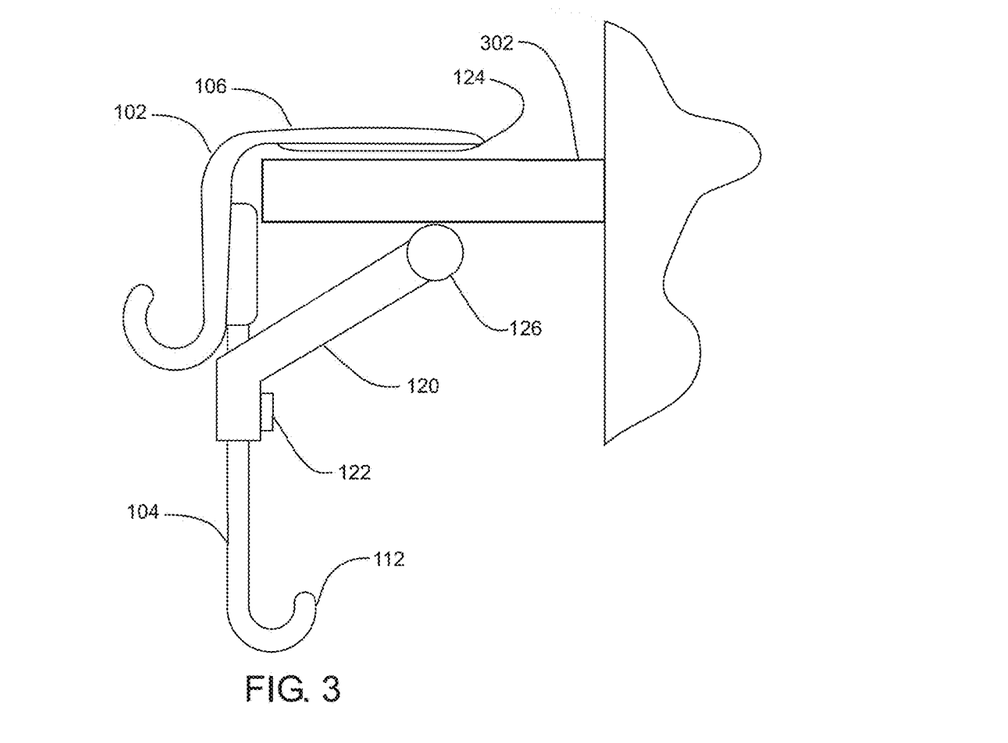
FIG. 3 illustrates a side view of a hanger device coupled to a horizontal support in accordance with an example embodiment.

FIG. 3 shows an example of a hanger device coupled to a horizontal structure 302. The top support 106 of the hanger support 102 is positioned on an upper surface of the horizontal structure 302, and the engagement lock 120 is slid up the lower hanger 104 to contact a bottom surface of the horizontal structure 302 at an oblique angle to the lower hanger 104. The slide lock 122 is engaged to maintain the engagement lock 120 in a position that stabilizes the hanger device on the horizontal structure 302. Additionally, various techniques and/or structures can be applied to the hanger device that further strengthen the grip to the horizontal structure, which can include, without limitation, increasing friction between the hanger device and the horizontal structure, increasing the gripping force of the hanger device, adapting the hanger device structure to block rotation due to moment forces that cause the hanger device to rotate relative to the horizontal structure, and the like, including combinations thereof. In some cases, a material can be utilized at the interface(s) between the hanger device and the horizontal structure to increase the interface friction. For example, a first friction layer 124 can be coupled to the underside of the top support 106 to increase the interface friction between the top support 106 and the horizontal structure 302. In another example, a second frictional layer 126 can be coupled to a surface of the engagement lock 120 that contacts the underside of the horizontal surface 302. The frictional materials can include any material capable of being applied to the hanger device that increases interface friction. Such materials can include various polymeric materials, natural or synthetic rubber materials, and the like. In some examples, the friction material can further protect the horizontal structure from damage related to the hanger device.

Figure 4:
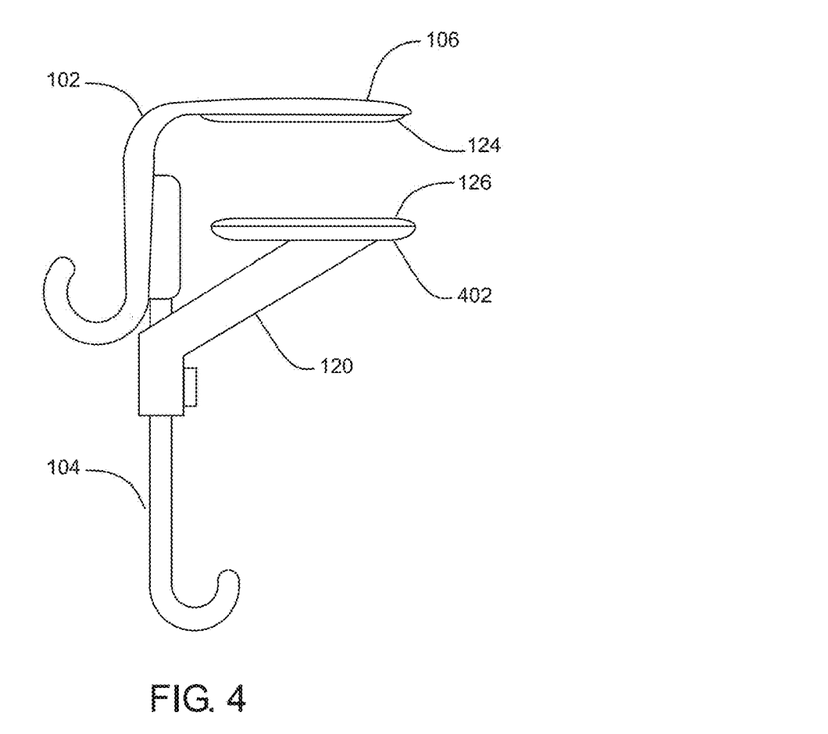
FIG. 4 illustrates a side view of a hanger device in accordance with an example embodiment.

FIG. 4 shows an example of a hanger device configuration where the engagement lock 120 includes a clamp member 402 positioned in a parallel orientation to the top support 106. The clamp member 402 has an increase surface area that, when the second frictional material 126 is applied thereto, can increase the interface friction between the hanger device and the horizontal structure.

Figure 5:
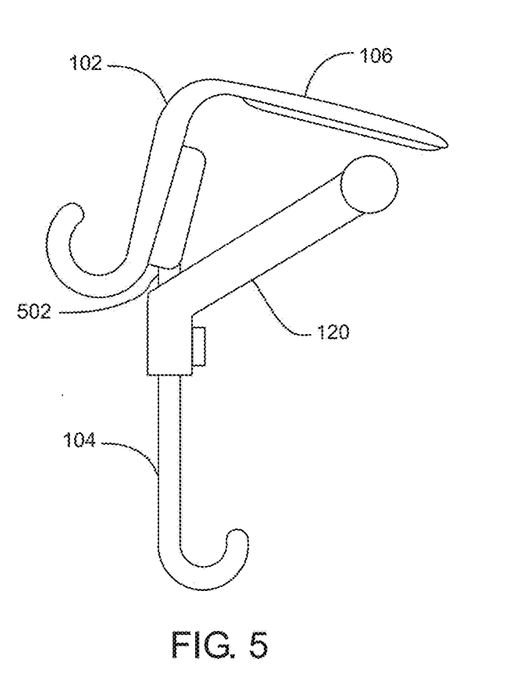
FIG. 5 illustrates a side view of a hanger device in accordance with an example embodiment.

FIG. 5 shows an example of a hanger device configuration to increase gripping force. In this example, the hanger support 102 is rotated toward the engagement lock 120, and is resiliently coupled to the lower hanger 104. The hanger support 102 is pulled or otherwise rotated away from the engagement lock 120 to allow the horizontal structure to be inserted therebetween, which increases the gripping force as a function of the resilience between the hanger device and the horizontal structure. The resilient coupling 502 can be an extension of the hanger support 102, the lower hanger 104, or a combination of the two. Additionally, the resilient coupling 502 can be a separate structure from the hanger support 102 and the lower hanger 104. In some examples, the lower hanger 104 can be bent so as to position the distal edge of the top support 106 in close proximity to the distal end of the engagement lock 120. As such, the lower hanger 104 is loaded with elastic energy as the hanger support 102 is rotated away from the engagement lock 120 to accommodate the thickness of the horizontal support. When released, the elastic energy stored in the lower hanger 104 rotates the hanger support 102 into the top surface of the horizontal structure, thus increasing the downward force applied.

Figure 6:
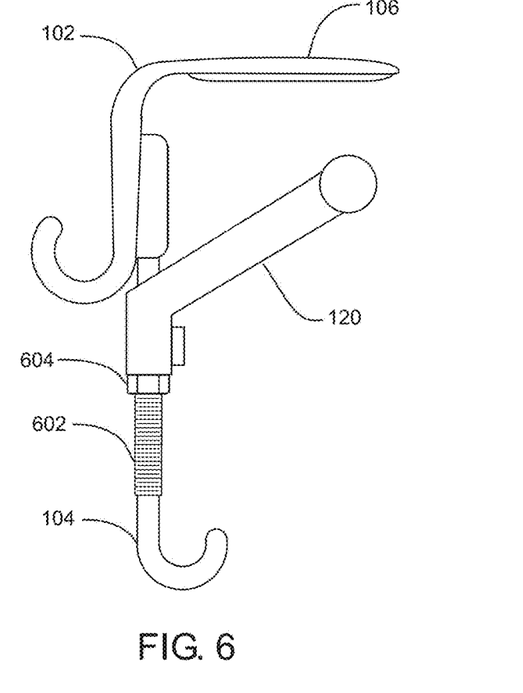
FIG. 6 illustrates a side view of a hanger device in accordance with an example embodiment.
Figure 7A:
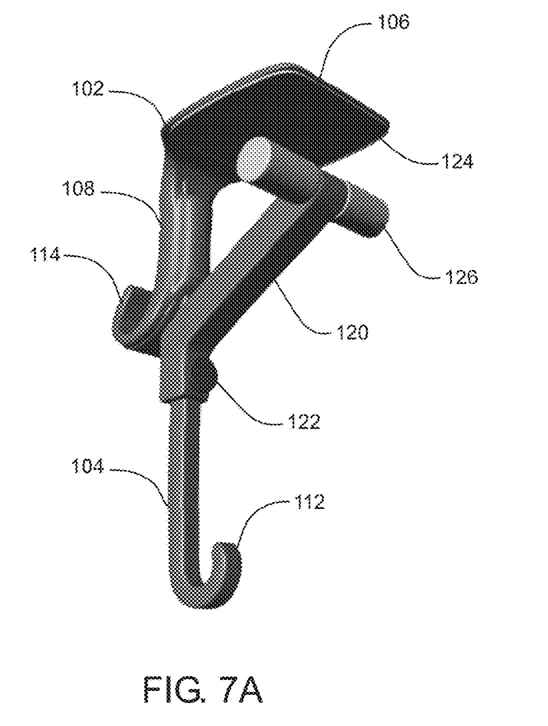
FIG. 7A illustrates an isometric view of a hanger device in accordance with an example embodiment.
Figure 7B:
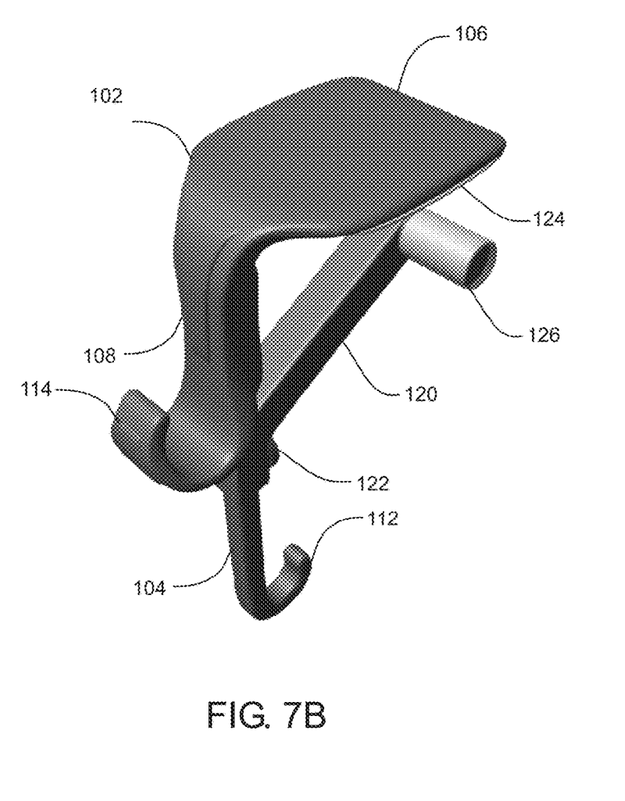
FIG. 7B illustrates an isometric view of a hanger device in accordance with an example embodiment.

FIG. 6 shows an example of a hanger device configuration that applies upward force to the engagement lock 120 to increase gripping force. In this example, the slide lock 604 is a nut or other screwable device adapted to apply upward force to the engagement lock 120. The lower hanger 104 includes a threaded section 602 adapted to engage and allow upward and downward movement as the nut is rotated. Thus, screwing the nut in an upward direction increases the force applied by the engagement lock 120 to the horizontal structure. FIGS. 7A&B show isometric views of exemplary hanger devices to show device aspects not visible in the preceding figures. For example, the second frictional layer 126 of the engagement lock 120 can have a length that extends the width of the top support 106. Extending the length of the second frictional layer can decrease the rotation and/or sliding of the hanger device relative to the horizontal structure when a load is applied to the lower hook 112 of the lower hanger 104. In some examples the second frictional layer 126 can be a coating layer formed on lateral extensions of the engagement lock 120.

Figure 8:
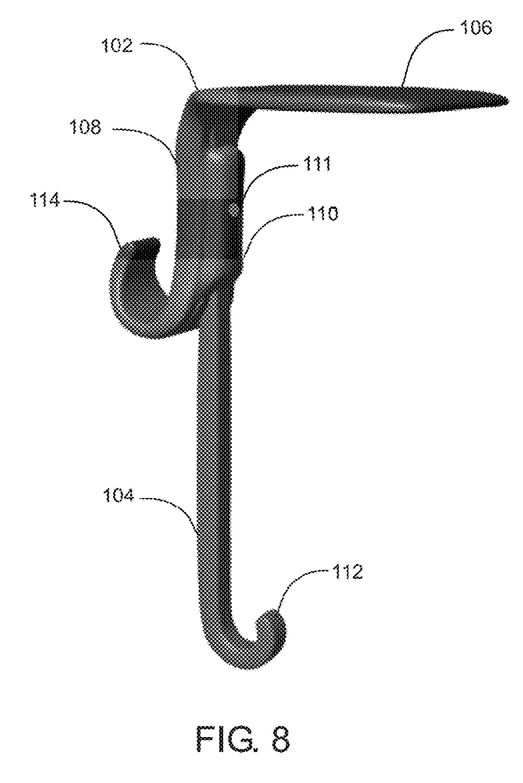
FIG. 8 illustrates an isometric view of a hanger device in accordance with an example embodiment.

FIG. 8 shows an isometric view of a hanger device with the engagement lock removed to show further details of the device. This view shows the hanger support 102 with the horizontal top support 106 and the edge extension 108 that rest upon the upper surface and along the edge, respectively, of the horizontal structure while in use. Also shown is the lower hanger 104 coupled to the hanger support 102 at the socket 110, which is held in place by, for example, a set screw 111. Additionally shown are the upper hook 114 and the lower hook 112.

Figure 9:
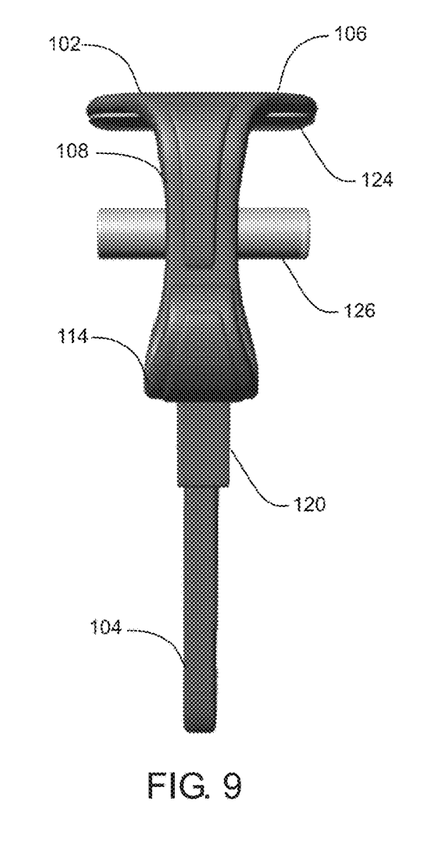
FIG. 9 illustrates a rear view of a hanger device in accordance with an example embodiment.

FIG. 9 shows a view of a hanger device when viewed in a direction looking toward the horizontal structure, which includes the hanger support 102 with the horizontal top support 106 and the edge extension 108 that rest upon the upper surface and along the edge, respectively, of the horizontal structure while in use. Also shown is the lower hanger 104 and the engagement lock 120 slidably coupled to the lower hanger 104. The second frictional surface 126 is shown extending laterally from a portion of the engagement lock 120 that is obscured behind the edge extension 108 and the upper hook 114.

Figure 10:
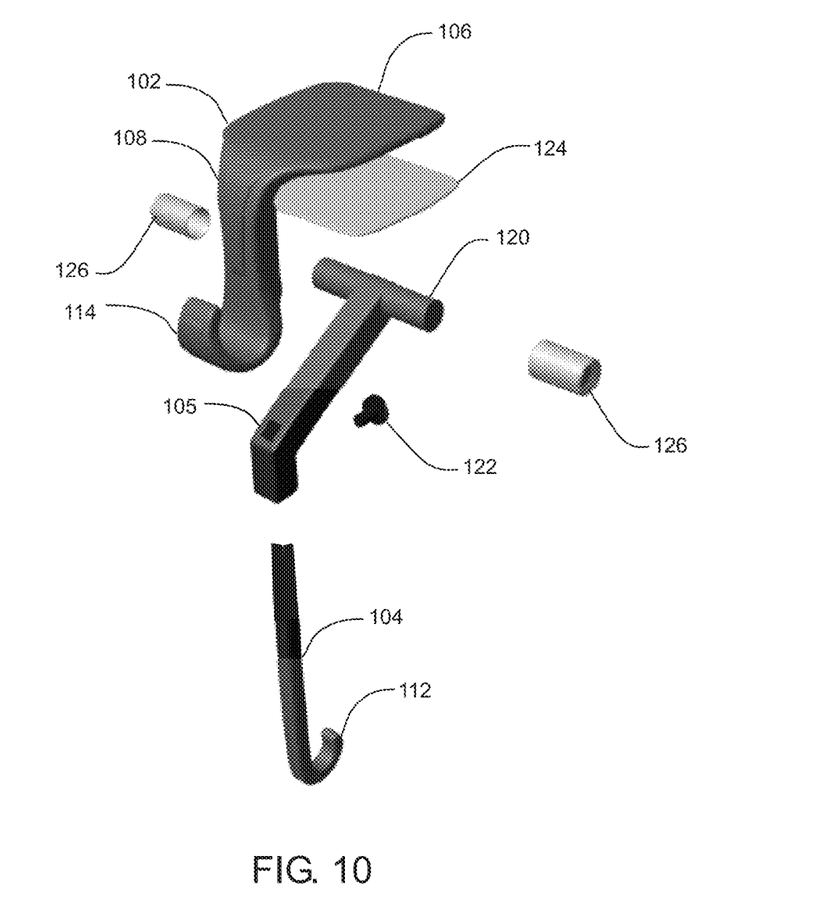
FIG. 10 illustrates an isometric exploded view of a hanger device in accordance with an example embodiment.
Figure 11:
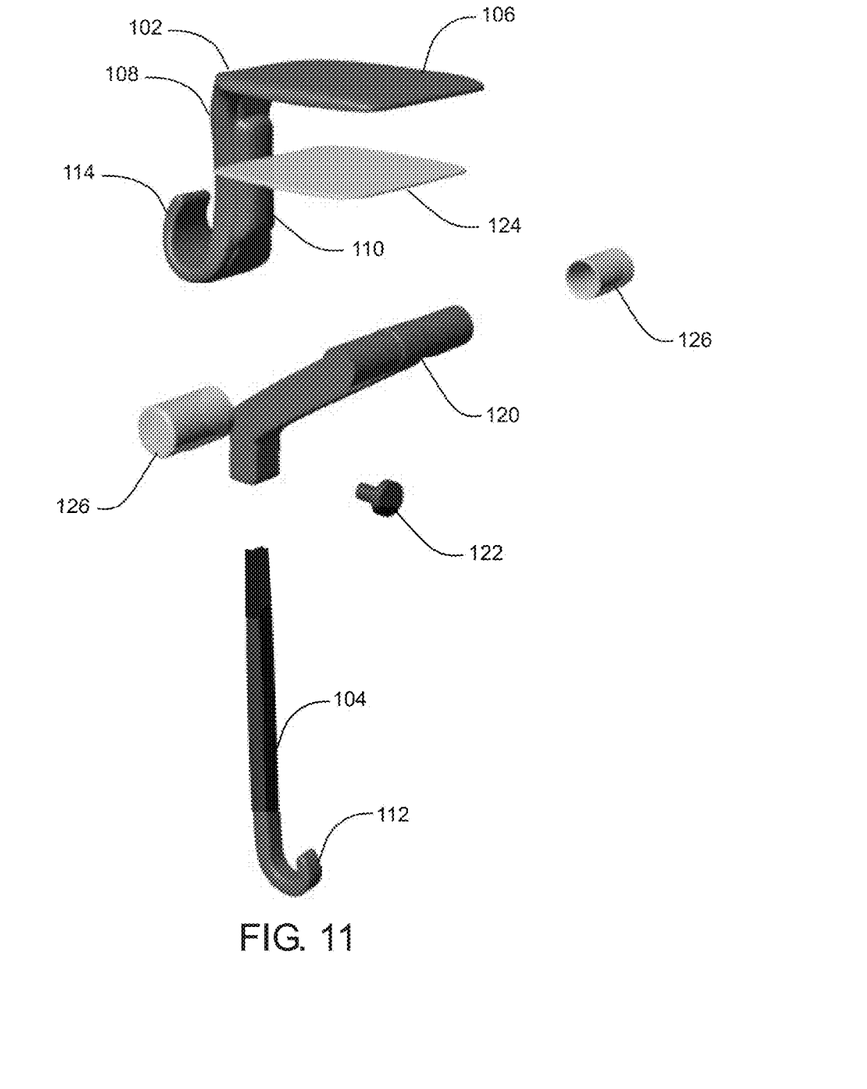
FIG. 11 illustrates an isometric exploded view of a hanger device in accordance with an example embodiment.

FIGS. 10A&B show isometric exploded views of a hanger device showing the hanger support 102 with the horizontal top support 106 and the edge extension 108 that rest upon the upper surface and along the edge, respectively, of the horizontal structure while in use. The first frictional surface 124 is also shown detached from the underside of the top support 106. The hanger support 102 additionally includes the upper hook 114 positioned to hold items along the edge of the horizontal structure. The hanger device further includes the lower hanger 104 with the lower hook 112, which can be inserted through hole 105 to couple with socket 110, thus allowing the engagement lock 120 to slide up and down the lower hanger 104. The engagement lock 120 includes lateral extensions upon which the second frictional surfaces 126 are formed or coupled. Once the engagement lock 120 is slid into the desired position, slide lock 122 can be engaged to maintain the engagement lock 120 at the desired position along the lower hanger 104.

What is claimed, is:

1. A hanger device structurally configured to couple at an edge of a horizontal support, comprising:
    a hanger support including:
        a horizontal top support having a planar undersurface structurally configured to rest on an upper surface of the horizontal support when in use;
        an edge extension extending downwardly from the horizontal top support; and
        an upper hook coupled to the edge extension and facing away from the horizontal support;
    a lower hanger coupled to and extending downwardly from the edge extension;
    a lower hook coupled to the lower hanger and oriented to suspend a decorative item therefrom; and
    an engagement lock having an upper frictional end and a lower engagement end structurally configured to completely encircle and linearly slide along the lower hanger when in use in order to contact the upper frictional end against a bottom surface of the horizontal support opposite the horizontal top support to secure the hanger device to the horizontal support.

2. The device of claim 1, further comprising a first frictional layer coupled to the planar undersurface to increase a gripping force of the hanger device.

3. The device of claim 2, further comprising a second frictional layer coupled to the upper frictional end of the engagement lock and positioned to contact the bottom surface of the horizontal support to increase the gripping force of the hanger device.

4. The device of claim 1, wherein the edge extension is oriented perpendicular to the planar undersurface of the horizontal top support.

5. The device of claim 1, wherein the lower hook is facing toward the horizontal support.

6. The device of claim 1, wherein the lower hook is facing away from the horizontal support.

7. The device of claim 1, wherein the engagement lock further comprises a slide lock configured to lock the engagement lock in a fixed position relative to the horizontal top support.

* * * * *